(12) United States Patent
Seo et al.

(10) Patent No.: US 9,288,213 B2
(45) Date of Patent: Mar. 15, 2016

(54) SYSTEM AND SERVICE PROVIDING APPARATUS

(71) Applicants: Naotoshi Seo, Tokyo (JP); Masato Nakajima, Tokyo (JP); Yasuharu Fukuda, Kanagawa (JP)

(72) Inventors: Naotoshi Seo, Tokyo (JP); Masato Nakajima, Tokyo (JP); Yasuharu Fukuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 59 days.

(21) Appl. No.: 14/065,584

(22) Filed: Oct. 29, 2013

(65) Prior Publication Data

US 2014/0123240 A1     May 1, 2014

(30) Foreign Application Priority Data

Oct. 31, 2012   (JP) .................................. 2012-241368

(51) Int. Cl.
*H04L 29/06* (2006.01)

(52) U.S. Cl.
CPC .......... *H04L 63/104* (2013.01); *H04L 63/0807* (2013.01)

(58) Field of Classification Search
None
See application file for complete search history.

(56) References Cited

U.S. PATENT DOCUMENTS

| | | | | |
|---|---|---|---|---|
| 5,889,952 | A * | 3/1999 | Hunnicutt ........... | G06F 21/6218 709/219 |
| 6,356,937 | B1 * | 3/2002 | Montville et al. ............ | 709/206 |
| 8,544,066 | B2 | 9/2013 | Hatakeyama | |
| 2002/0156906 | A1 * | 10/2002 | Kadyk et al. ................... | 709/229 |
| 2002/0157022 | A1 * | 10/2002 | Katada et al. .................. | 713/201 |
| 2003/0022657 | A1 * | 1/2003 | Herschberg et al. ........... | 455/414 |
| 2004/0054779 | A1 * | 3/2004 | Takeshima et al. ........... | 709/225 |
| 2008/0133669 | A1 * | 6/2008 | Ge et al. ......................... | 709/206 |
| 2010/0002250 | A1 | 1/2010 | Sakagami et al. | |
| 2011/0154443 | A1 * | 6/2011 | Thakur et al. ...................... | 726/3 |
| 2012/0011358 | A1 * | 1/2012 | Masone ......................... | 713/153 |
| 2012/0011571 | A1 * | 1/2012 | Moroney ........... | H04N 21/4405 726/4 |
| 2012/0060031 | A1 * | 3/2012 | Huang .................... | H04L 9/083 713/168 |
| 2012/0109728 | A1 * | 5/2012 | Sparks ............... | G06Q 30/0214 705/14.16 |
| 2012/0179802 | A1 * | 7/2012 | Narasimhan et al. ......... | 709/223 |
| 2013/0031158 | A1 * | 1/2013 | Salsburg ....................... | 709/203 |
| 2013/0074066 | A1 * | 3/2013 | Sanzgiri et al. .................... | 718/1 |
| 2013/0198211 | A1 | 8/2013 | Kohkaki et al. | |
| 2013/0198806 | A1 | 8/2013 | Takatsu et al. | |

FOREIGN PATENT DOCUMENTS

JP      2009-038795      2/2009
WO    WO2009/084601    7/2009

* cited by examiner

*Primary Examiner* — Peter Poltorak
(74) *Attorney, Agent, or Firm* — IPUSA, PLLC

(57) ABSTRACT

A disclosed system having a first service providing system providing a service to an apparatus and a second service providing system having an authentication infrastructure different from that of the first service providing system includes a connection destination changing unit receiving a permission request, from an apparatus operated by a first user, of requesting that a second user uses the second service providing system, changes a connection destination of the apparatus to the second service providing system, and causes the second service providing system to perform a permission process; an authority information acquiring unit receiving permission information indicating that the permission request is admitted from the apparatus and acquires post-permission authority information by using the permission information; and an authority information providing unit providing the post-permission authority information associated with the second user based on a request for a process received from another apparatus operated by the second user.

8 Claims, 14 Drawing Sheets

MANAGEMENT SETUP SERVICE APPLICATION

AUTHENTICATION PROCESSING UNIT

FIG.8

| id | ORGANIZATION ID | ORGANIZATION NAME | .... | .... | .... |
|---|---|---|---|---|---|
| 1 | XXX | COMPANY A | | | |
| 2 | YYY | COMPANY B | | | |
| .... | | | | | |

FIG.9

| id | ORGANIZATION ID | USER ID | PASSWORD | USER NAME | .... |
|---|---|---|---|---|---|
| 1 | XXX | UserA | AAA | USER A | |
| 2 | XXX | UserB | BBB | USER B | |
| .... | | | | | |
| | YYY | UserC | CCC | USER C | |
| | YYY | UserD | DDD | USER D | |

FIG.10

| id | ORGANIZATION ID | DEVICE AUTHENTICATION INFORMATION | BUSINESS OFFICE INFORMATION | CAPABILITY | ... |
|---|---|---|---|---|---|
| 1 | XXX | 111 | BUSINESS OFFICE A | A4 COLOR | |
| 2 | XXX | 222 | BUSINESS OFFICE B | A2 COLOR | |
| 3 | XXX | 333 | BUSINESS OFFICE B | A4 MONOCHROME | |
| 4 | YYY | 444 | – | A4 COLOR | |

FIG.11

| PERMISSION SETUP INFORMATION ID | EXTERNAL SERVICE ID (SP_ID) | SCOPE | CLIENT ID | REFRESH TOKEN | ORGANIZATION ID | USER ID |
|---|---|---|---|---|---|---|
| 03ijigawoea2 | ○○○ | aa,bb | AAAAAAA | XXXXXXX | XXX | userA |
| A0jig1wfoea | ○○○ | aa | AAAAAAA | XXXYYYY | XXX | userA |
| 41ji490fJSea | ×××  | – | BBBBBBB | ZZZZZZZ | YYY | userB |
| 3Mnfeuf27d | △△△ | – | CCCCCCC | ZZZZYYYY | ZZZ | userC |

FIG.12

| SP_ID | CLIENT ID | CLIENT SECRET | PRODUCT NAME | PERMISSION SERVER URL | REDIRECTION DESTINATION URL |
|---|---|---|---|---|---|
| ○○○ | AAAAAAA | XXXXXXXX | ○○○.○○○ | http://www.○○○.com/auth | http://www.XXX.com/callback |
| ○○○ | AAAA0000 | YYYYYYYY | ○○○.○○○ | http://www.○○○.com/auth | http://www.XXX.com/callback |
| ×︎×︎×︎ | BBBBBBB | ZZZZZZZZ | ○○○.○○○ | http://www.×︎×︎×︎.com/auth | http://www.XXX.com/callback |
| △△△ | CCCCCCC | 00000000000 | ○○○.○○○ | http://www.△△△.com/auth | http://www.XXX.com/callback |

FIG.13

| id | ORGANIZATION ID | USER ID | SP_ID | SCOPE | PERMISSION TOKEN | EXPIRATION DATE |
|---|---|---|---|---|---|---|
| 1 | XXX | UserA | OOOOO | aa,bb | token:aaaaa, | 2012/8/15 |
| 2 | XXX | UserA | PPPPPP | aa | token:ccccc, | 2012/8/15 |
| 3 | XXX | UserB | QQQQQ | | token:eeeee, | 2012/8/17 |
| ... | | | | | | |
| | YYY | UserC | TTTTTT | | token:aaaaa, | 2012/8/15 | ns
SYSTEM AND SERVICE PROVIDING APPARATUS

BACKGROUND OF THE INVENTION

1. Field of the Invention

The present invention relates to a system and a service providing apparatus.

2. Description of the Related Art

An exemplary access authority management system performs a central management for access management or authority delegation in a case where an apparatus accesses another apparatus by proxy using authority delegated from a user to the apparatus for the purpose of decreasing information exchanged between the apparatuses. The access authority management system is described in, for example, International Publication Pamphlet No. 2009/084601.

The exemplary access authority management system includes authentication device managing conditions for delegating authority, a service providing apparatus for providing a service in response to a service request, and a service delegate access apparatus accessing the service providing apparatus by proxy.

In recent years attention has been given to a usage mode of providing functions of a web application or of an application on a server' side as a service. Typically, this service is known as a "cloud computing service". In this usage mode, authentication is necessary to enjoy a service in response to the authority of a user.

Further, a usage mode of associating a plurality of services is known to be watched. This usage mode is typically "mashup". In this usage mode, permission is necessary in order to be provided with another service in response to authority, by which one service is delegated from a user.

In the usage mode where a plurality of services are associated, the user is required to follow a permission procedure for each of other services when the user is provided with the other services in response to authority of one service delegated by the user.

SUMMARY OF THE INVENTION

Accordingly, embodiments of the present invention provide a novel and useful system and a service providing apparatus solving one or more of the problems discussed above.

More specifically, the embodiment of the present invention is provided in view of the above. The object of the present invention is to provide a system and a service providing apparatus, by which the number of permission procedures performed by a user in order to use a service can be reduced.

One aspect of the embodiments of the present invention may be to provide a system having a first service providing system that provides a service to an apparatus and a second service providing system that has an authentication infrastructure different from that of the first service providing system including a connection destination changing unit that receives a permission request, from an apparatus operated by a first user, of requesting that a second user uses the second service providing system, changes a connection destination of the apparatus to the second service providing system, and causes the second service providing system to perform a permission process; an authority information acquiring unit that receives permission information indicating that the permission request is admitted from the apparatus and acquires post-permission authority information for using the second service providing system by using the permission information from the second service providing system; and an authority information providing unit that provides the post-permission authority information associated with the second user based on a request for a process using the second service providing system, the request is received from another apparatus operated by the second user.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 8 is an exemplary structural view of organization management information;

FIG. 9 is an exemplary structural view of user management information;

FIG. 10 is an exemplary structural view of apparatus management information;

FIG. 11 is an exemplary structural view of permission setup information;

FIG. 12 is an exemplary structural view of external service information;

FIG. 13 is an exemplary structural view of permission token information;

DETAILED DESCRIPTION OF THE PREFERRED EMBODIMENTS

A description is given below, with reference to FIG. 1 through FIG. 19 of embodiments of the present invention. Where the same reference symbols are attached to the same parts, repeated description of the parts is omitted.

Reference symbols typically designate as follows:
1: system;
11: client terminal;
12: mobile terminal;
14: image forming apparatus;
15: projector;
16: extra apparatus;
21, 31: access controlling apparatus;
22: print service providing apparatus;
23: scan service providing apparatus;
24: management setup service providing apparatus;
25: extra service providing apparatus;
32: external service providing apparatus;
50: service providing system;
51: service application;
52: platform;
53: management data memory unit;
54: platform application programming interface (API);
61: print service application;
62: scan service apparatus;
63: management setup service application;
64: extra service application;
71: authentication processing unit;
72: device communication unit;
73: session management unit;
74: data processing unit;
81: organization management information memory unit;
82: user management information memory unit;
83: apparatus management information memory unit;
84: permission setup information memory unit;
85: external service information memory unit;
86: permission token information memory unit;
87: data management information memory unit;
88: data storage;
101: screen processing unit;
102: information registration requesting unit;
111: authentication unit;
112: information registering unit;
113: redirect requesting unit;
114: permission token acquiring unit;
115: permission token storing unit;
116: permission token providing unit;
121: authentication requesting unit;
122: screen processing unit;
123: permission token acquisition requesting unit;
124: processing requesting unit;
131: asynchronous front unit;
132: asynchronous worker unit;
500: computer system;
501: input device;
502: display device;
503: external I/F;
503a: recording medium;
504: RAM;
505: ROM;
506: CPU;
507: communication I/F;
508: HDD;
B: bus;
FW: firewall; and
N1 to N4: network.

First Embodiment

<System Structure>

Figure 1:
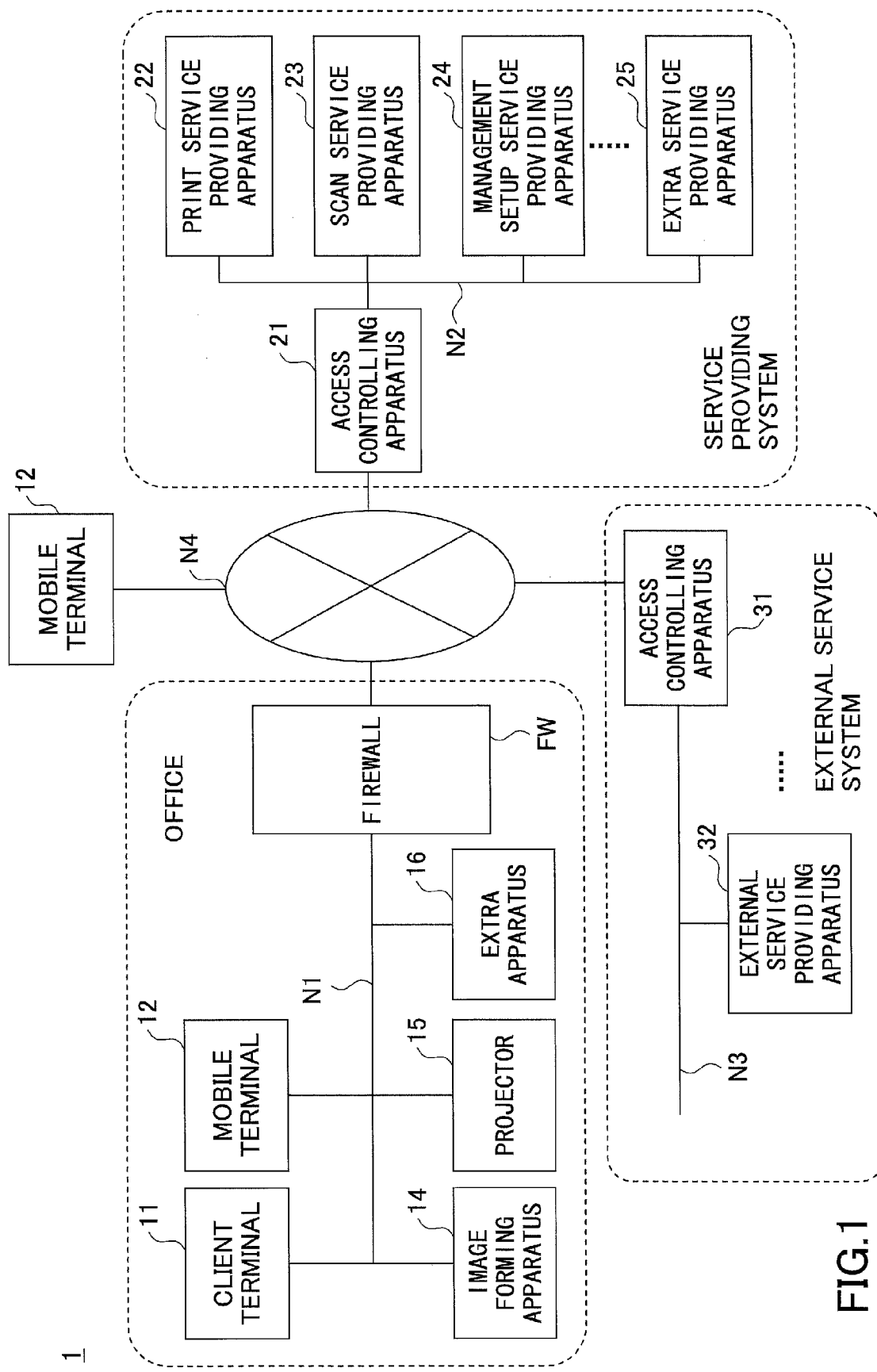
FIG. 1 illustrates an exemplary structure of a system related to an embodiment.

FIG. 1 illustrates an exemplary structure of a system related to an embodiment of the present invention. Referring to FIG. 1, a system 1 includes a network N1 such as an inter-office network, a network N2 of a service providing system represented by a cloud computing service, a network N3 of an external service represented by a cloud computing service, and a network N4 such as the Internet.

The network N1 is a private network inside the firewall FW. The firewall FW is installed at a node between the network N1 and the network N4. The firewall FW detects and blocks an unauthorized access. A client terminal 11, a mobile terminal 12, an image forming apparatus 14 such as a multifunction peripheral, a projector 15, and an extra apparatus 16 such as an electronic copyboard.

The client terminal 11 is an example of a terminal device. The client terminal 11 is substantialized by an information processing apparatus (a computer system) in which an ordinary OS or the like is installed. The client terminal 11 includes a wired or wireless communication means. The client terminal 11 is a terminal, which can be operated by the user, such as a tablet PC or a notebook PC.

The mobile terminal 12 is an example of the terminal device. The mobile terminal 12 includes a wired or wireless communication means. The mobile terminal 12 such as a smartphone, a portable phone, a tablet PC, a notebook PC, or the like, can be brought by the user.

The image forming apparatus 14 is an apparatus having an image forming function such as a multifunction peripheral. The image forming apparatus 14 has a wireless or wired communication means. The image forming apparatus 14 is an apparatus of performing processes related to image formation such as a copier, a scanner, a printer, or a laser printer. The projector 15 is an apparatus projecting an image. The projector 15 includes a wired or wireless communication means.

Referring to FIG. 1, for example, the number of the client terminal 11, the number of the mobile terminal 12, the number of an image forming apparatus 14, the number of the projector 15, and the number of extra apparatus 16 are single. However, these numbers may be plural.

The network N2 is connected to the network N4 such as the Internet by an access controlling apparatus 21. Security of the network N2 is protected by the access controlling apparatus 21. A print service providing apparatus 22, a scan service providing apparatus 23, a management setup service providing apparatus 24, and extra service providing apparatus 25 are connected with the network N2. In the system 1 illustrated in FIG. 1, the access controlling apparatus 21, the print service providing apparatus 22, the scan service providing apparatus 23, the management setup service providing apparatus 24, and the extra service providing apparatus 25 substantializes the service providing system.

The access controlling apparatus 21 controls login to various services such as the print service provided by the print service providing apparatus 22, the scan service provided by the scan service providing apparatus 23, the management setup service provided by the management setup service providing apparatus 24, or the like.

The access controlling apparatus 21, the print service providing apparatus 22, the scan service providing apparatus 23, the management setup service providing apparatus 24, and the extra service providing apparatus 25 are substantialized by one or more information processing apparatuses (a computer system).

The print service providing apparatus 22, the scan service providing apparatus 23, the management setup service providing apparatus 24, and the extra service providing apparatus 25 may be substantialized by integrating into one computer or by distributing into a plurality of computers.

The network N3 is connected to the network N4 such as the Internet by an access controlling apparatus 31. Security of the network N3 is protected by the access controlling apparatus 31. One or more external service providing apparatuses 32 are connected to the network N3. In the system 1 of FIG. 1, the external service system is substantialized by the access controlling apparatus 31 and the external service providing apparatus 32.

The access controlling apparatus 31 controls login to the external service provided by the external service providing apparatus 32. The access controlling apparatus 31 and the external service providing apparatus 32 are substantialized by one or more information processing apparatuses (computer systems). In the system 1 of FIG. 1, the external service providing apparatus 32 may be substantialized by integrating into one computer or by distributing into a plurality of computers.

A part of the service on the side of the network N2 may exist outside the network N2. The mobile terminal 12 may exist in a network such as an inter-office network outside the network N1. In the system 1 of FIG. 1, the mobile terminal 12 exists in the network N1 and the network N4 such as the Internet. In the system 1 of FIG. 1, the number of the external service system is one. However, the number of the external service system may be plural.

In the system 1 of FIG. 1, a standard technique called OAuth approved by API is used. The service providing system corresponds to a Consumer of OAuth. The external service system corresponds to a Service Provider (SP) of OAuth.

The external service system publishes Web Application Programming Interface (API). The user can access a resource stored in the external service system and a service handling the resource within a range of authority of the user himself or herself through WebAPI.

Further, the print service providing apparatus 22 or the like of the service providing system can access a resource stored in the external service system or a service handling the resource within a range of the authority delegated from the user by using a permission token based on the authority delegated from the user.

<Hardware Structure>

Figure 2:
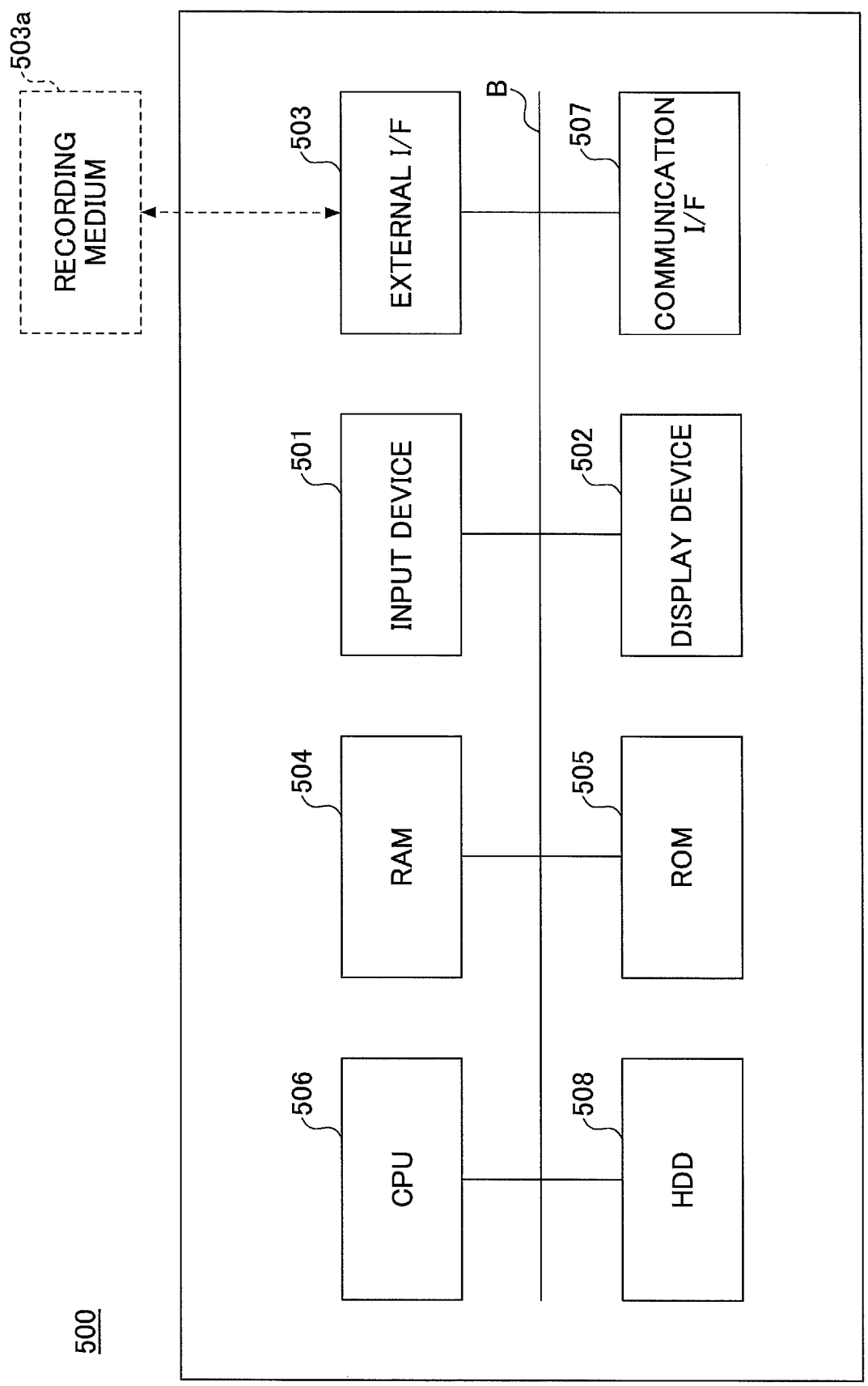
FIG. 2 illustrates an exemplary hardware structure of a computer system of the embodiment.

The client terminal 11, the mobile terminal 12, the access managementling apparatus 21, the print service providing apparatus 22, the scan service providing apparatus 23, the management setup service providing apparatus 24, and the extra service providing apparatus 25 are substantialized by, for example, a computer system having a hardware structure illustrated in FIG. 2. Further, the access controlling apparatus 31 and the external service providing apparatus 32 are substantialized by, for example, the computer system having the hardware structure illustrated in FIG. 2.

FIG. 2 illustrates an exemplary hardware structure of the computer system of the embodiment. Referring to FIG. 2, the information processing apparatus 500 includes an input device 501, a display device 502, an external I/F 503, a random access memory (RAM) 504, a read only memory (ROM) 505, a central processing unit (CPU) 506, a communication I/F 507, and a hard disk drive (HDD) 508, which are mutually connected through a bus B.

The input device 501 includes a keyboard, a mouse, a touch panel, and/or the likes, by which the user inputs various operation signals. The display device 502 includes a display or the like to display a processing result obtained by the computer system 500.

The communication I/F 507 is an interface provided to connect the computer system 500 to the networks N1 to N4. Thus, the computer system 500 can perform data communications with another device and/or another apparatus through the communication I/F 507.

The HDD 508 is a non-volatile memory device storing programs and/or data. The program and/or data to be stored is an operating system (OS), which is basic software controlling the entire computer system 500, application software providing various functions in the OS, and so on. Further, the HDD 508 manages the stored program and the stored data using a predetermined file system and/or a predetermined data base (DB).

The external I/F 503 is an interface with an external apparatus. The external apparatus is a recording medium 503a or the like. With this, the computer system 500 can read information from the recording medium 503a and/or write information to the recording medium 503a through the external I/F 503. The recording medium 503a includes a flexible disk, a compact disk (CD), a digital versatile disk (DVD), an SD memory card, a universal serial bus (USB) memory, or the like.

The ROM 505 is a non-volatile semiconductor memory (memory device) which can hold program and/or data even when a power source to the ROM 105 is powered off. The ROM 505 stores programs and data used for a basic input/output system (BIOS), OS setup, network setup, or the like, which are executed at a time of booting up the computer system 500. The RAM 504 is a volatile semiconductor memory (memory device) temporarily storing programs and/or data.

The CPU 506 reads the program and/or data onto the RAM 504 from the memory device such as the ROM 505, the HDD 508, or the like. The read program or data perform the process to thereby entirely substantialize controls or functions of the computer system 500.

The client terminal 11, the mobile terminal 12, the access controlling apparatus 21, the print service providing apparatus 22, the scan service providing apparatus 23, the management setup service providing apparatus 24, and the extra service providing apparatus 25 substantializes various processes described below by the hardware structure of the computer system 500. Further, the access controlling apparatus 31 and the external service providing apparatus 32 can substantialize various processes described below using the hardware structure of the computer system 500.

<Software Structure>
<<Service Providing System>>

Figure 3:
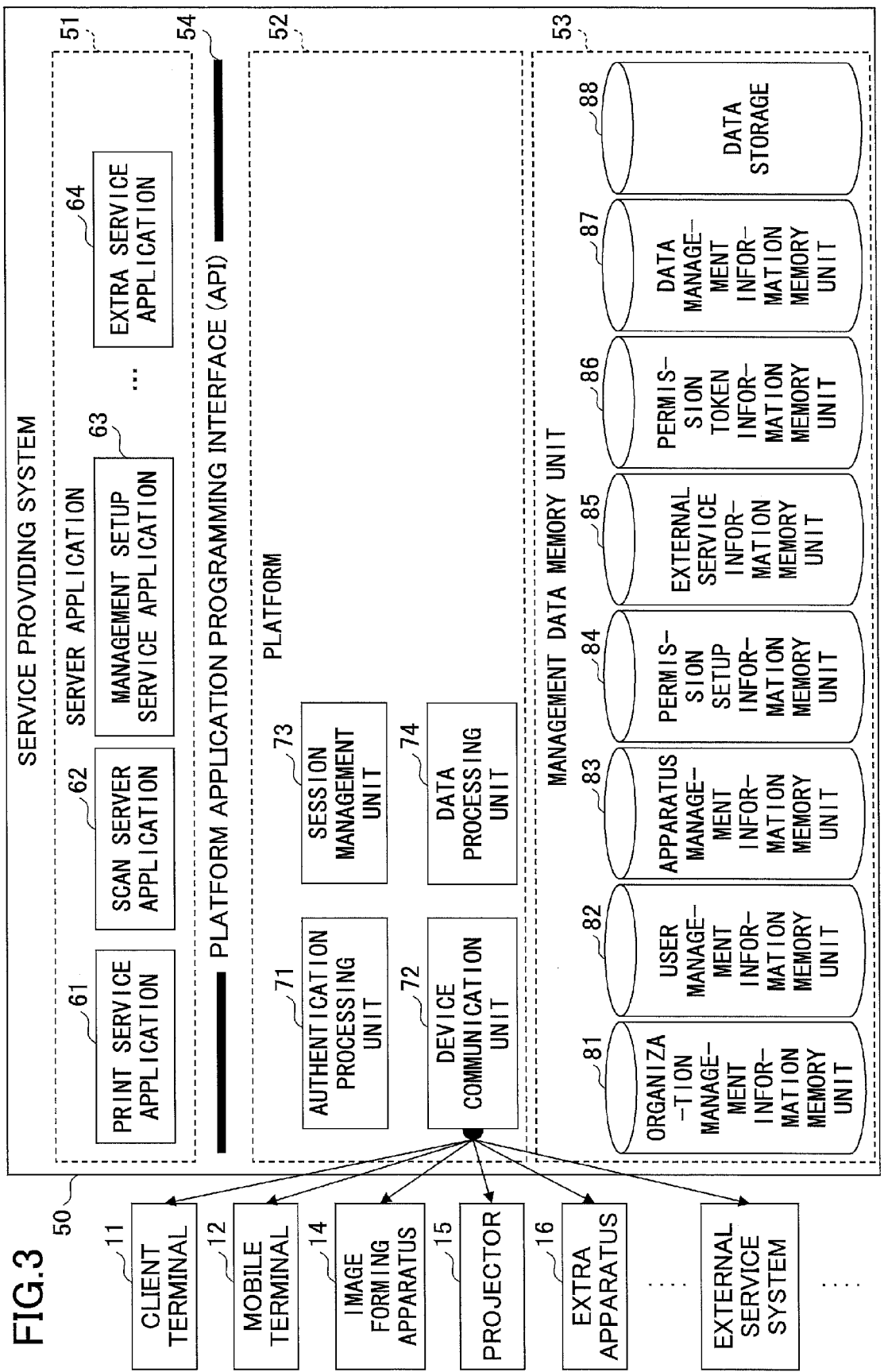
FIG. 3 is an exemplary processing block chart of a service providing system of the embodiment.

The service providing system 10 of the embodiment is substantialized by, for example, a processing block illustrated in FIG. 3. FIG. 3 is an exemplary processing block chart of the service providing system of the embodiment. The service providing system 50 substantializes a service application 51, a platform 52, a management data memory unit 53, and a platform application programming interface (API) 54 by executing the program.

The service application 51 illustrated in FIG. 3 includes, for example, a print service application 61, a scan service apparatus 62, a management setup service application 63, and an extra service application 64 whose number is one or more. The print service application 61 is an application providing a print service. The scan service apparatus 62 is an application for providing a scan service. The management setup service application 63 is an application for providing management setup service. Further, the extra service application 64 is an application for providing any kind of service.

The platform API 54 is an interface used when the service application 51 such as the print service application 61, the scan service apparatus 62, the management setup service application 63, the extra service application 64, or the like uses the platform 52. The platform API 54 is an interface previously defined so that the platform 52 receives a request from the service application 51. The platform API 54 is structured by, for example, a function, a class, or the like. In a case where the service providing system 50 is structured by a plurality of distributed information processing apparatuses 50, the platform API 54 can use, for example, a Web API, which is used through the network.

The platform 52 illustrated in FIG. 3 includes, for example, an authentication processing unit 71, an device communication unit 72, a session management unit 73, and a data processing unit 74. The authentication processing unit 71 performs authentication based on a login request received from office equipping device such as the client terminal 11, the image forming apparatus 14, or the like. The office equipping device is a collective term of the client terminal 11, the mobile terminal 12, the image forming apparatus 14, the projector 15, and the extra apparatus 16. The device communication unit 72 communicates with the office equipping device or the external service system. The session management unit 73 manages a session with the office equipping device or the external service system. The data processing unit 74 performs data processing based on a request from the service application 51.

The management data memory unit 53 includes an organization management information memory unit 81, a user management information memory unit 82, an apparatus management information memory unit 83, a permission setup information memory unit 84, an external service information memory unit 85, a permission token information memory unit 86, a data management information memory unit 87, and a data storage 88, as an example.

The organization management information memory unit 81 stores organization management information described below. The user management information memory unit 82 stores the user management information described below. The apparatus management information memory unit 83 stores apparatus management information described below. The permission setup information memory unit 84 stores permission setup information described below. The external service information memory unit 85 external service information described below. The permission token information memory unit 86 stores permission token information described below. The data management information memory unit 87 stores data management information. The data storage 88 stores other data or the like.

The service providing system 50 functions as a cloud infrastructure having functions such as authentication or an asynchronous transformation, a group of services providing a service such as a print service using the functions of the cloud infrastructure, and a management setup service for performing a management setup of the services.

The cloud infrastructure is formed by, for example, the platform 52, the management data memory unit 53, and the platform API 54. The group of services is formed by, for example, the service application 51. The management setup service is formed by, for example, the management setup service application 63.

The function of the authentication in the cloud infrastructure of the service providing system 50 is formed by, for example, the authentication processing unit 71 and a database for the authentication.

The database for the authentication is formed by an organization management information memory unit 81, a user management information memory unit 82, an apparatus management information memory unit 83, a permission setup information memory unit 84, an external service information memory unit 85, a permission token information memory unit 86, and/or the like.

Further, the function of the asynchronous transformation in the cloud infrastructure of the service providing system 50 is formed by, for example, the data processing unit 74, a data management information memory unit 87, and a data storage 88.

The group of services such as the service application 51 provide the service by using the authentication included in the cloud infrastructure of the service providing system 50 and the function of the asynchronous transformation. In a case where the group of services provides the service in association with the function of the external service system, the group of the services acquires a permission token for accessing the external service system through the function of the authority included in the cloud infrastructure.

The management setup service application 63 performs a management setup for a permission process. The management setup service application 63 includes a UI for the permission procedure. The management setup service application 63 registers permission setup information described below in association with the authentication processing unit 71.

The external service system is a system other than the service providing system 50. The external service system provides a service such as a cloud computing service. Within the embodiment, the service (the function) provided by the external service system is called the external service. The external service includes an online storage service, a storage and management service for a scanned document, or the like.

The external service system has a function as a permission server which issues a permission token in response to a request from the authentication processing unit 71 of the service providing system 50. A WebAPI is provided to the external service system. The WebAPI of the external service system receives a processing request using the permission token. The WebAPI is used to provide the service to the service application 51 of the service providing system 50.

Referring to FIG. 3, the authentication processing unit 71 has a function as a permission client in the service providing system 50. Therefore, organization management information, user management information, apparatus management information, permission setup information, external service information, and permission token information, which are commonly used by a plurality of service applications 51 can be uniformly managed to thereby improve a security and reduce a management cost.

Further, the service providing system 50 uniformly manages a management process for managing the permission information such as the permission setup information, the external service information, and the permission token, and the permission process into the authentication processing unit 71. Therefore, various mashup services of associating a plurality of services can be provided without the service application 51 by the permission procedure performed by the user only one time.

The service providing system 50 illustrated in FIG. 3 stores the organization management information, the user management information, the apparatus management information, the permission setup information, the external service information, or the like, which are information required to be perpetually stored, in, for example, an HDD 508. The service providing system 50 illustrated in FIG. 3 may store information such as the permission token information whose expiration date is determined and whose life cycle is shorter than other information such as the organization management information, the user management information, the apparatus management information, the permission setup information, the external service information, or the like, which are information required to be perpetually stored, in, for example, an HDD 508 in, for example, a RAM 504 (an online memory) in place of the HDD 508. By storing the above information in the on memory, the permission token information can be read and written at a high speed. Thus, a response becomes high.

<<Management Setup Service Application 63>>

Figure 4:
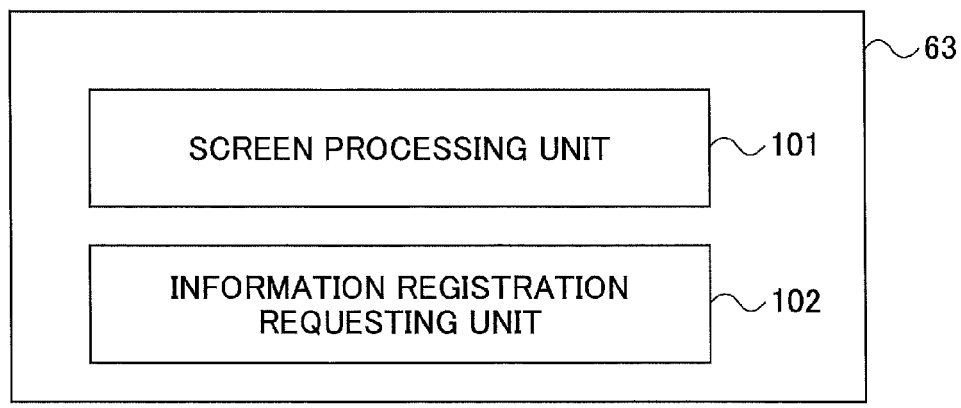
FIG. 4 is a processing block chart in a management setup service application related to the embodiment.

The management setup service application is substantialized by a processing block illustrated in, for example, FIG. 4. FIG. 4 is a processing block chart in the management setup service application 63 of the embodiment. The management setup service application 63 causes the computer system 500 to function as a screen processing unit 101 and an information registration requesting unit 102.

The screen processing unit 101 performs processes related to the screen such as generation of the setup screen, through which an administrator sets the management setup information. The information registration requesting unit 102 requests the authentication processing unit 71 to register information input into the screen such as the setup screen generated by the screen processing unit 101.

<<Authentication Processing Unit 71>>

Figure 5:
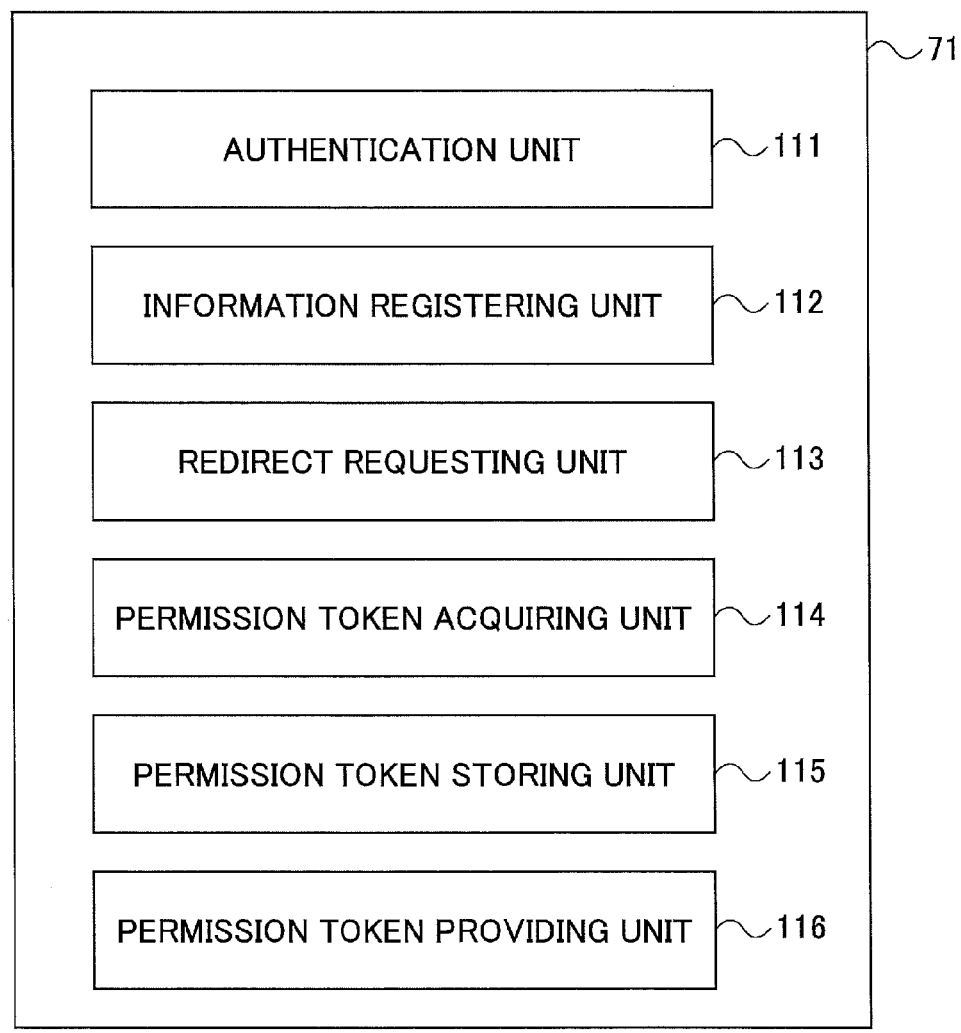
FIG. 5 is an exemplary processing block chart in an authentication processing unit of the embodiment.

The authentication processing unit 71 is substantialized by the processing block illustrated in, for example, FIG. 5. FIG. 5 is an exemplary processing block chart in the authentication processing unit 71 of the embodiment. The authentication processing unit 71 includes an authentication unit 111, an information registering unit 112, a redirect requesting unit 113, a permission token acquiring unit 114, a permission token storing unit 115, and a permission token providing unit 116.

The authentication unit 111 receives a request for authentication and issues an authentication ticket. The information registering unit 112 receives a request for registration of information and registers the information. The redirect requesting unit 113 request the office equipping device such as the client terminal 11 operated by the administrator to redirect to a predetermine screen. The permission token acquiring unit 114 uses the permission setup information and the external service information, which are stored in the permission setup information memory unit 84, to acquire the permission token from the external service system. The permission token storing unit 115 stores the permission token acquired from the external service system in the permission token information memory unit 86.

The permission token providing unit 116 receives the request for acquisition of the permission token and provides, if there is the permission token, which can be provided to the permission token information memory unit 86, the permission token. If there is not the permission token, which can be provided to the permission token information memory unit 86, the permission token providing unit 116 requests the permission token acquiring unit 114 to acquire the permission token and provides the acquired permission token.

<<Service Application 51>>

Figure 6:
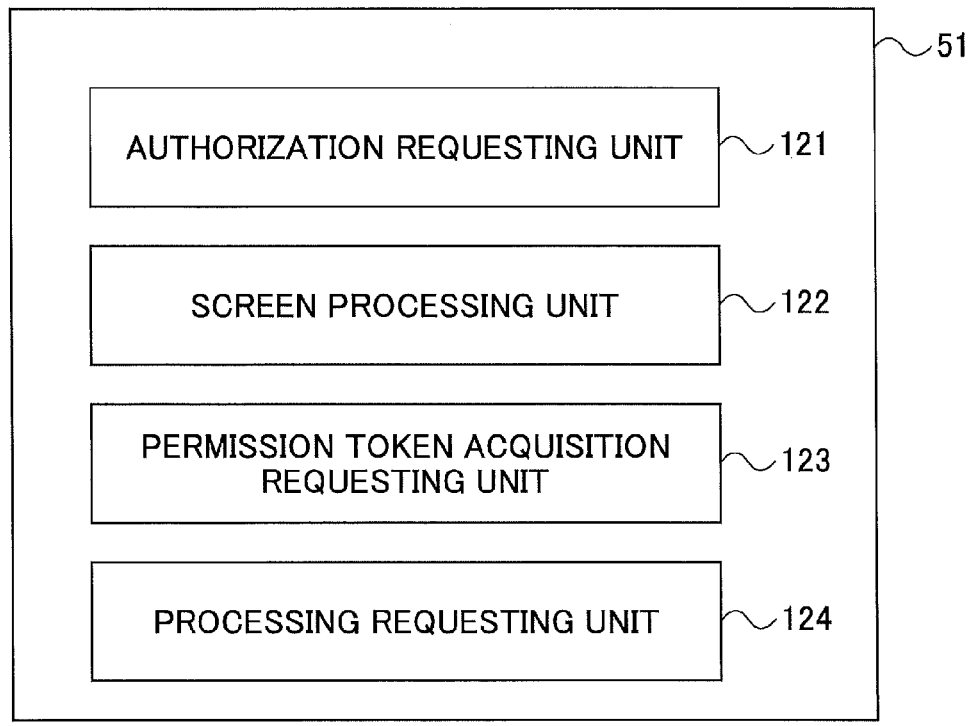
FIG. 6 is a processing block chart in a service application of the embodiment.

The service application 51 is substantialized by a processing block illustrated in, for example, FIG. 6. FIG. 6 is a processing block chart in the service application 51 of the embodiment. The service application 51 causes the computer system 500 to function as an authentication requesting unit 121, a screen processing unit 122, a permission token acquisition requesting unit 123, and a processing requesting unit 124.

The authentication requesting unit 121 requests authentication from the authentication processing unit 71. The screen processing unit 122 performs processes related to the screen such as generation of the login screen. The permission token acquisition requesting unit 123 requests the authentication processing unit 71 to acquire the permission token necessary for using the WebAPI of the external service system. The processing requesting unit 124 uses the permission token and requests the WebAPI of the external service to process. The processing requesting unit 124 may request the data processing unit 74 to process an asynchronous process such as asynchronous transformation or the like.

<<Data Processing Unit 74>>

Figure 7:
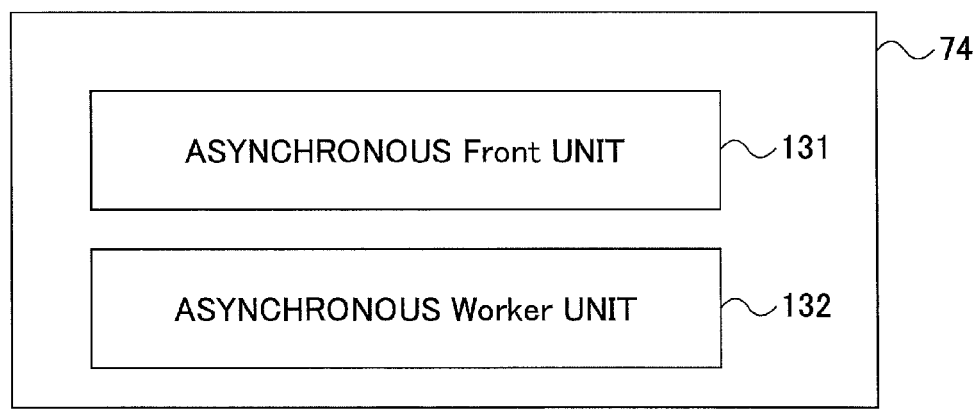
FIG. 7 is an exemplary processing block chart in a data processing unit of the embodiment.

The data processing unit 74 is substantialized by a processing block illustrated in, for example, FIG. 7. FIG. 7 is an exemplary processing block chart of the data processing unit 74 of the embodiment. The data processing unit 74 includes an asynchronous front unit 131 and an asynchronous worker unit 132.

The asynchronous front unit 131 receives a request for an asynchronous process as a job from the service application 51 and stores the request for the asynchronous process as a job in the data management information memory unit 87. The data management information memory unit 87 functions as a message queue.

The asynchronous worker unit 132 sequentially acquires jobs from the data management information memory unit 87 and performs the asynchronous process. In a case where the external service system is used, the asynchronous worker unit 132 requests the authentication processing unit 71 to send the permission token for the external service and acquires the permission token.

<<Management Data>>

FIG. 8 is an exemplary structural view of organization management information. The organization management information of FIG. 8 has an ID, an organization ID, an organization name, and/or the like as data items. The id is information uniquely specifying records of the organization management information. The organization ID is information uniquely specifying the organizations such as companies, departments or the like. The organization ID is not limited to a word such as the organization and may be information for identifying, for example, a contract. The service providing system 50 manages various services to be provided for each organization ID. Therefore, various services used by the organizations are registered in association with the organization IDs. Users of the organizations can use the services registered in association with the organization IDs. Therefore, the organization ID plays a role of service recipient management information, by which a service recipient to whom the service is provided by the service providing system 50 is managed. The organization names are names of the organizations.

FIG. 9 is an exemplary structural view of the user management information. Referring to FIG. 9, the user management information includes the id, the organization ID, the user ID, a user ID, a password, a user name, and/or the like, as data items. The id is information uniquely specifying records of the user management information. The user ID and the password are information for specifying the user under an authentication infrastructure of the service providing system 50. The user name is a name of the user. The password is not indispensable.

Further, the identification number of an electronic medium (for example, an IC card) owned by the user or the like may be used as the user ID. Although the user ID and the password, which are associated with the organization ID are uniquely determined, if the organization IDs are different, the user ID and the password may be redundantly determined.

FIG. 10 is an exemplary structural view of the apparatus management information. Referring to FIG. 10, the apparatus management information includes the id, the organization ID, the user ID, a user ID, device authorization information, business office information, capability and/or the like. The id is information uniquely specifying records of the apparatus management information. The device authorization information is for device authorization, by which it is determined that the office equipping device is provided with specific conditions. The device authorization information may be an ID indicating that a specific application is installed, a device number indicating that the device is a specific device, or the like. The business office information represents a business office where the office equipping device is installed. For example, the capability represents a performance of the office equipping device.

FIG. 11 is an exemplary structural view of permission setup information. Referring to FIG. 11, the permission setup information includes a permission setup information ID, external service ID (SP_ID), a scope, a client ID, a refresh token, the organization ID, and the user ID, as data items.

The permission setup information ID is information uniquely specifying the record of the permission setup information. The external service ID is information uniquely specifying the external service. The scope specifies a service range of the external service system. The client ID is information specifying a group of services in the service providing system 50. The client ID is issued by the external service system in advance. The refresh token is required to reissue the permission token.

FIG. 12 is an exemplary structural view of the external service information. Referring to FIG. 12, data items of the external service information includes an external service ID, a client ID, a client secret, a product name, a permission server URL, a redirection destination URL, and/or the like.

The client secret is secret information like a password for ensuring identity of the client ID to a person authentically corresponding to the client ID. The product name is information specifying the service application 51 registered in association with the client ID. The permission server URL is a URL at the destination of the redirection before the administrator determines the permission (a URL concerning a function as the permission server of the external service system). The redirection destination URL is a URL at the destination of the redirection after the administrator determines the permission (a URL concerning a function as the permission client of the authentication processing unit 71).

FIG. 13 is an exemplary structural view of the permission token information. Referring to FIG. 13, the permission token information includes the id, the organization ID, the user ID, the external service ID, the scope, the permission token, the expiration date, and so on, as data items. The id is information uniquely specifying records of the permission token information. The permission token is an access token acquired from the external service system. The expiration date is an expiration date for the permission token.

<Detailed Process>

Hereinafter, a detailed process of the system 1 of the embodiment is described.

<<Registration of Permission Setup Information and Storage of Permission Token Information>>

Figure 14:
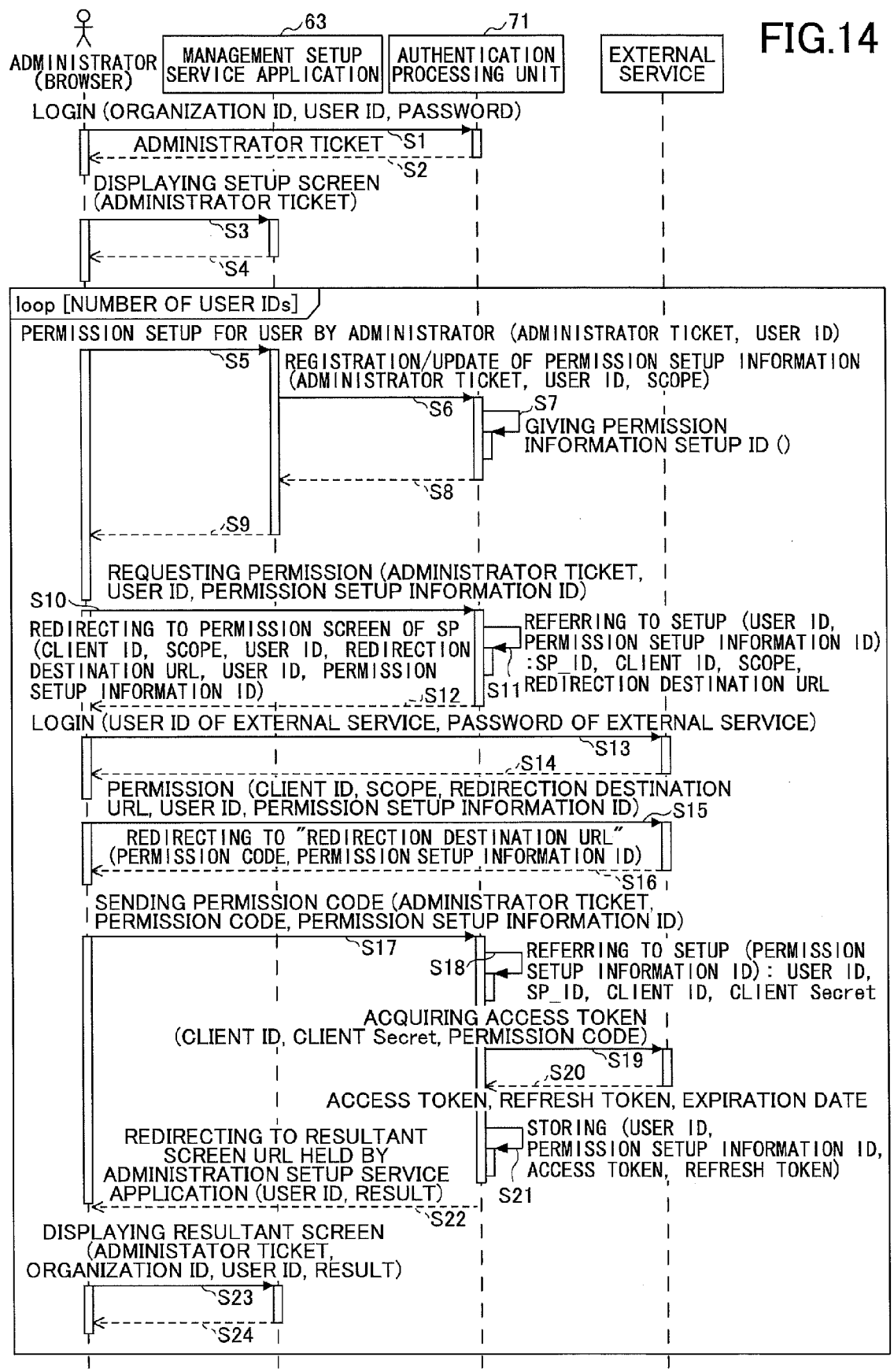
FIG. 14 is a sequence chart illustrating exemplary processes of registering the permission setup information and of storing the permission token information.

FIG. 14 is a sequence chart illustrating exemplary processes of registering the permission setup information and of storing the permission token information. In step S1, the authentication processing unit 71 receives a login request using account information such as the organization ID, the user ID, the password, or the like from the office equipping device such as the client terminal 11 operated by the administrator.

When the authentication processing unit 71 receives the request for the authentication using the account information such as the organization ID, the user ID, the password, or the like from the office equipping device, the authentication processing unit 71 refers to the user management information stored in the user management information memory unit 82 and authenticates the account information. When the authentication of the account information is successful, the authentication processing unit 71 generates an authentication ticket of the administrator (an administrator ticket).

In step S2, the authentication processing unit 71 returns the administrator ticket to the office equipping device, from which the login is requested. Thereafter, the office equipping device can use the functions of the service providing system 50 by using the authentication ticket. The authentication processing unit 71 manages the administrator ticket and the account information by associating these.

In step S3, the management setup service application 63 receives a display request to display the setup screen using the administrator ticket, which is received from the office equipping device operated by the administrator. The management setup service application 63 identifies that the source of the display request for the setup screen is the administrator by referring to the administrator ticket. In step S4, the management setup service application 63 causes the setup screen for the administrator to be displayed on the office equipping device operated by the administrator. Then, the permission setup information, which can be registered, is displayed on the setup screen for the administrator.

In step S5, the administrator operates the office equipping device and selects the user ID to be applied with the permission setup, the external service ID of and the scope of the external service to be used. In step S6, the management setup service application 63 requests the authentication processing unit 71 to register the permission setup information selected by the administrator as a registration request.

In step S7, the authentication processing unit 71 numbers the permission setup information subject to the registration request with the permission setup information ID and registers the permission setup information into the permission setup information memory unit 84. In steps S8 and S9, the permission setup information ID is returned to the office equipping device operated by the administrator as a return. The management setup service application 63 may inquire the authentication processing unit 71 so that the permission setup information ID is acquired and the permission setup information ID is provided to the office equipping device.

In step S10, the administrator operates the office equipping device to request the authentication processing unit 71 to perform the permission procedure using the administrator ticket, the user ID of the user whose permission is required, and the permission setup information ID.

In step S11, the authentication processing unit 71 acquires at least a part of the parameter required for the permission from the permission setup information stored in the permission setup information memory unit 84 and from the external service information stored in the service information memory unit 85 using the user ID and the permission setup information ID, which are included in the request for the permission procedure, as keys.

The parameter required for the permission is the external service ID, the scope, the client ID uniquely identifying the service application 51, the redirection destination URL at the destination of the redirection after the administrator determines the permission, and an arbitrary session key for maintaining a session. In step S12, the authentication processing unit 71 acquires the permission server URL from the external service information stored in the external service information memory unit 85 and causes the parameters required for the permission to be redirected to the permission server URL as a query of GET request.

Here, the arbitrary session key for maintaining the session is necessary because of the following reasons. The permission screen through which the administrator permits is displayed by an external service system. Since the redirection of the parameter to the permission server is performed by the authentication processing unit 71 after the administrator determines the permission, the session in an HTTP level of the authentication processing unit 71 breaks. Because the authentication processing unit 71 performs a series of flows for acquiring a permission code within a single session, an arbitrary session key can be used.

The OAuth is a protocol having a structure where an arbitrary session key can be designated. In the system 1 of the embodiment, by designating the permission setup information ID as the session key, the permission setup information ID is handed at the time of the redirection. Therefore, the user permitted by the administrator and the content of the permission can be known.

As described above, the permission server URL is a URL at the destination of the redirection before the administrator determines the permission (the URL concerning the function as the permission server of the external service system). The external service system, to which the redirection is performed, checks the administrator ticket using information of cookies in order to verify that the administrator on the source of the request is a registered user. For example, if the administrator has already logged in the external service system, the administrator ticket is cached by a browser. Therefore, the administrator ticket exists. On the other hand, if the administrator has not logged in the external service system, there is no administration ticket in the external service system. In this case, the external service system displays a login screen 1000 illustrated in FIG. 15 on the office equipping device operated by the administrator in order to prompt the login.

Figure 15:
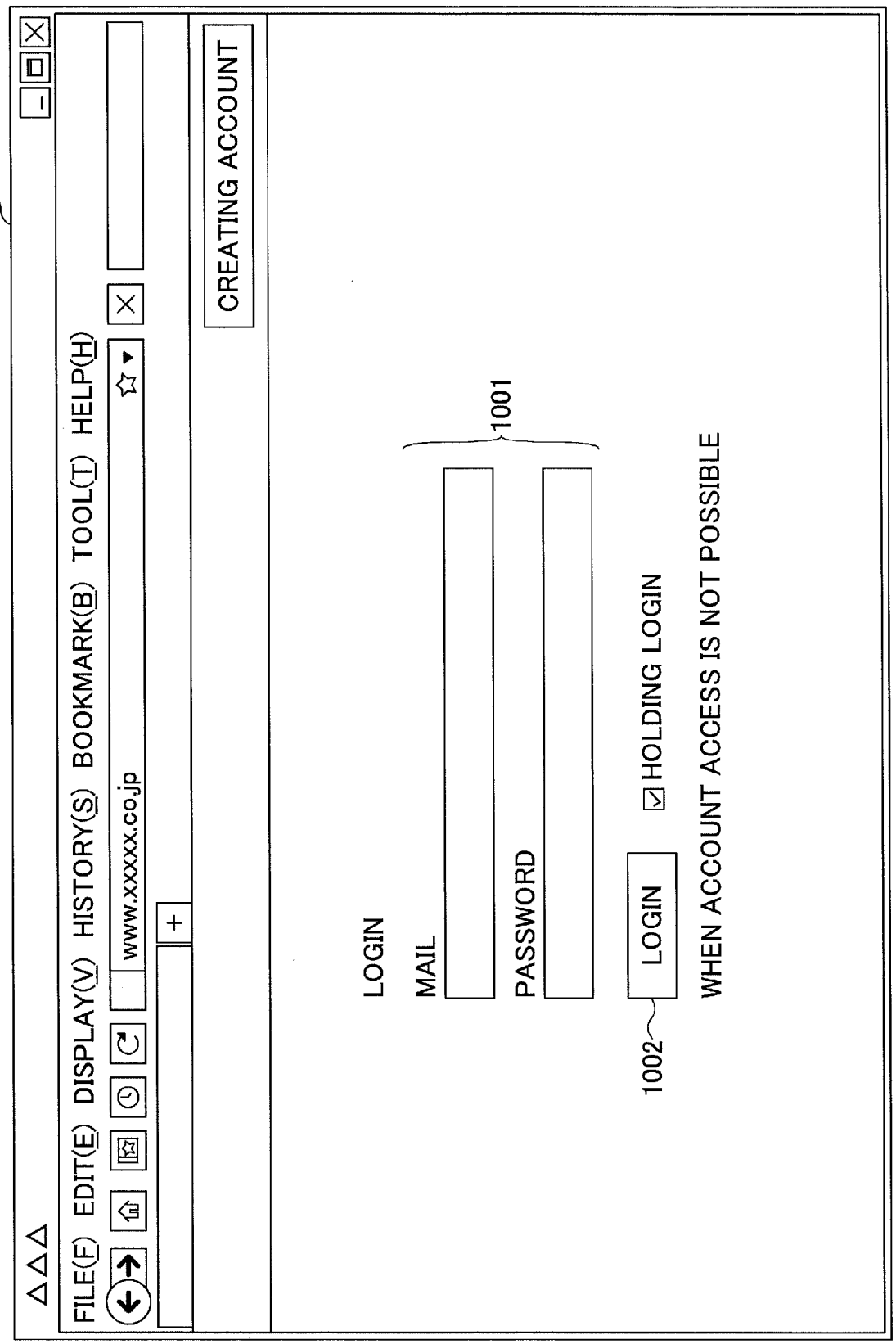
FIG. 15 is an image chart of an exemplary login screen.
Figure 16:
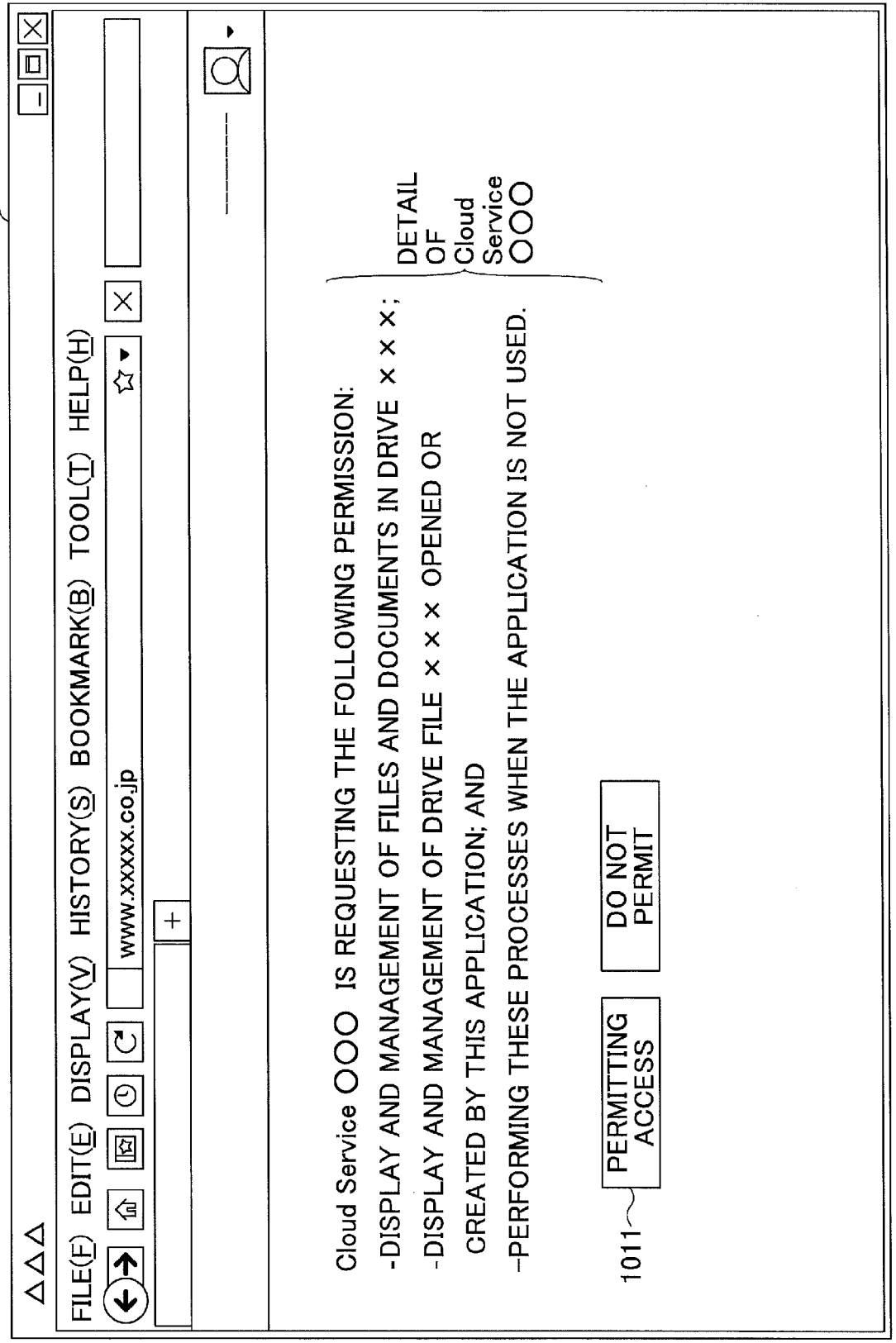
FIG. 16 is an image chart of an exemplary permission screen.

FIG. 15 is an image chart of an exemplary login screen. The login screen 1000 illustrated in FIG. 15 includes a column 1001 for inputting a mail address as an example of the user ID and a password of the external service and a login button 1002. The administrator operates the office equipping device so that the mail address and the password fill the column 1001 and thereafter the login button 1002 is pushed.

After the login button is pushed, the office equipping device requests the external service system to log in using the user ID of and the password of the external service in step S13. Then, when the login is successful, the external service system displays a permission screen 1010 illustrated in FIG. 16 on the office equipping device operated by the administrator who already login in order to prompt the permission concerning a use of the external service in step S14. The process of step S13 is omitted in a case where the administrator has already logged in.

The administrator checks the object of the permission from a product name and the scope, which are registered in advance as the permission setup information or the part of the external service information in association with the client ID and determines the permission. In a case where the use of the external service is permitted, the administrator pushes the permission button 1101 down on the permission screen 1010.

When the permission button 1011 is pushed down, the office equipping device operated by the administrator reports the determination of the permission to the external service system using the client ID, the scope, the redirection destination URL, the user ID, and the permission setup information ID in step S15. After the determination of the permission is reported, the external service system redirects a query, which is attached with the permission code indicative of the permission and the permission setup information ID as an example of the session key, to the redirection destination URL in step S16.

In step S17, the office equipping device operated by the administrator sends the administration ticket, the permission code, and the permission setup information ID to the redirection destination URL being the destination of the redirection after determining the permission. FIG. 14 illustrates an example in which the redirection destination URL is the authentication processing unit 71.

In step S18, the authentication processing unit 71 acquires at least a part of the parameter required for acquiring the permission token (an access token illustrated in FIG. 14) from the permission setup information stored in the permission setup information memory unit 84 and from the external service information stored in the service information memory unit 85 using the permission setup information ID as a key. For example, in step S18, the authentication processing unit 71 acquires the user ID, the external service ID, the client ID, and the client secret. The parameter required to acquire the permission token is, for example, the client ID, the client secret, the permission code, or the like.

In step S19, the authentication processing unit 71 sends the client ID, the client secret, and the permission code added as the query to the external system as request information in order to acquire the permission token required to access the WebAPI of the external service system from the external service system. In step S20, the external service system verifies the permission code, and issues the permission token, the refresh token, and the expiration date to the authentication processing unit 71 to thereby provide these to the authentication processing unit 71.

The permission token is required to access the WebAPI. The expiration date is ordinarily set to the permission token. When the expiration date of the permission token expires, the permission token cannot access the WebAPI. The refresh token is required to reissue the permission token.

In step S21, the authentication processing unit 71 stores the permission token and the expiration date, which are provided by the external service system, in association with the user information (the organization ID and the user ID) and the external service ID, as permission token information, into the permission token information memory unit 86.

Further, the authentication processing unit 71 stores the refresh token into the permission setup information stored in the information memory unit 84 in association with the user information and the external service. In step S22, the authentication processing unit 71 causes the URL of the management setup service application 63 to redirect the user ID and a value indicative of the permission result, as a query.

In step S23, the office equipping device operated by the administrator sends the administrator ticket, a company ID, a user ID, and a value indicative of a permission result to the URL of the management setup service application 63 and requests to display a screen showing the permission result. In step S24, the management setup service application 63 causes the office equipping device to display the screen showing the permission result.

<<Use of External Service>>

Figure 17:
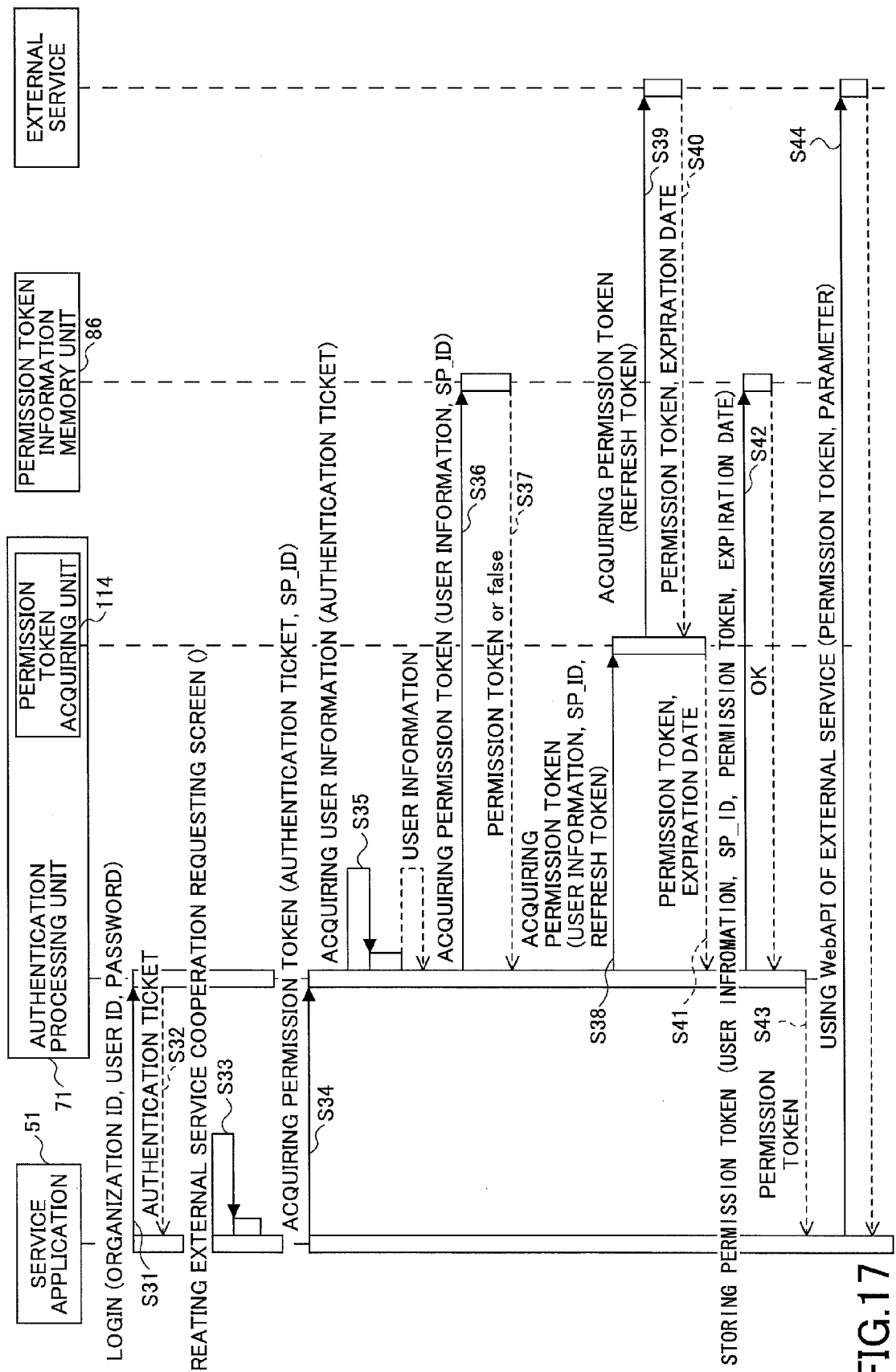
FIG. 17 is a sequence chart illustrating an exemplary procedure for using an external service.

FIG. 17 is a sequence chart illustrating an exemplary procedure for using the external service. Referring to FIG. 17, the sequence chart illustrates processes where the service application 51 acquires the permission token and uses the external service.

The service application 51 receives a login request using account information such as the organization ID, the user ID, the password, or the like from the office equipping device such as the client terminal 11 operated by the user. In step S31, the service application 51 requests the authentication processing unit 71 to authenticate using the organization ID, the user ID, and the password, which are included in the login request received by the service application 51.

When the authentication processing unit 71 receives the request for the authentication using the account information such as the organization ID, the user ID, the password, or the like from the authentication processing unit 71, the authentication processing unit 71 refers to the user management information stored in the user management information memory unit 82 and authenticates the account information. When the authentication of the account information is successful, the authentication processing unit 71 generates an authentication ticket of the user. In step S32, the authentication processing unit 71 sends the authentication ticket to the service application 51. The service application 51 sends the authentication ticket to the office equipping device on the source of the login request.

Thereafter, the office equipping device can use the functions of the service providing system 50 by using the authentication ticket. The authentication processing unit 71 manages the authentication ticket and the user information by associating these.

In step S33, the service application 51 receives a cooperation request for cooperation between the office equipping device operated by the user and the external service from the office equipping device. In step S33, the service application 51 generates an external service cooperation requesting screen illustrated in, for example, FIG. 18, and causes the office equipping device operated by the user to display the external service cooperation requesting screen.

Figure 18:
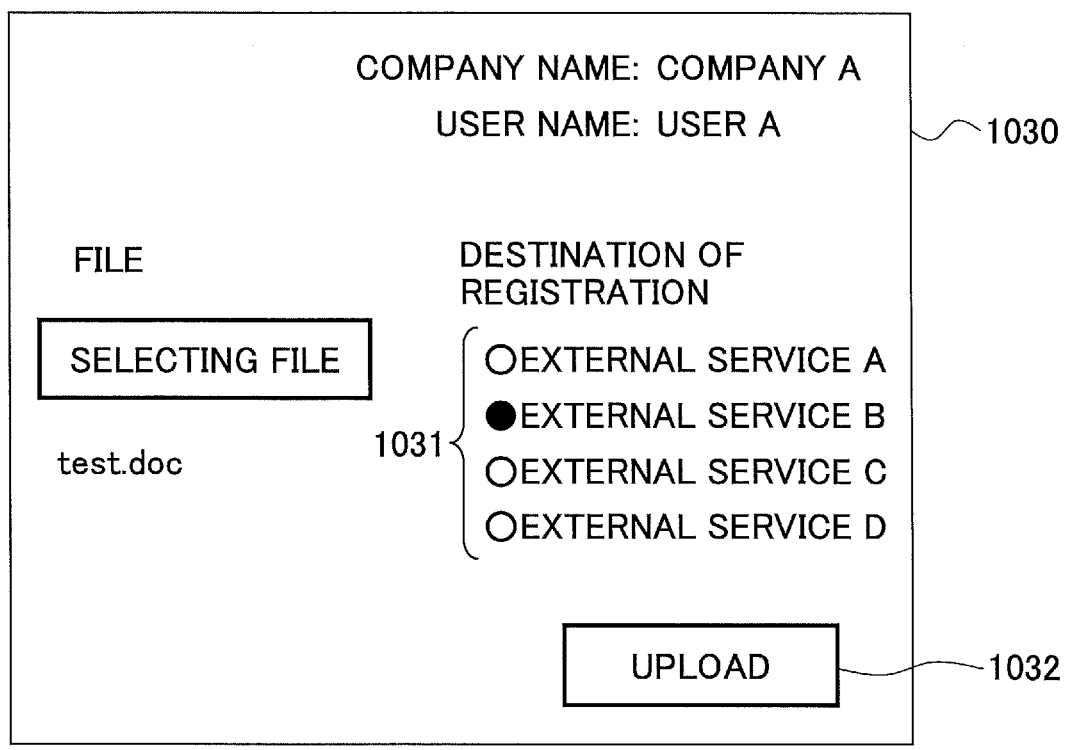
FIG. 18 illustrates an image of an exemplary external service cooperation requesting screen.

FIG. 18 illustrates an exemplary image of the external service cooperation requesting screen. Referring to FIG. 18, the external service cooperation requesting screen 1030 is, for example, a file upload cooperation screen. The external service cooperation requesting screen 1030 includes radio buttons 1031 for causing the user to select the external service cooperating with the office equipping device and an upload button 1032. The user operates the office equipping device to select the external device to cooperate with and thereafter to push the upload button 1032.

On the external service cooperation requesting screen 1030, an example of selecting the external service to cooperate with the office equipping device operated by the user. When the upload button 1032 is pushed, the service application 51 starts the processes on and after step S34 in FIG. 17. In step S14, the service application 51 requests the authentication processing unit 71 to acquire the permission token using the external service ID selected in the external service cooperation requesting screen 1030 and the authentication ticket acquired in step S32.

In step S35, the authentication processing unit 71 acquires the user information associated with the authentication ticket using the authentication ticket included in the request for the acquisition of the permission token. In step S36, the authentication processing unit 71 requests the permission token information memory unit 71 to acquire the permission token associated with the user information, which is associated with the authentication ticket, and with the external service ID of the external service, which is selected by the user through the external service cooperation requesting screen 1030.

If the permission token associated with the user information and the external service ID is stored in the permission token information memory unit 86, in step S37, the authentication processing unit 71 acquires the permission token and its expiration date from the permission token information memory unit 86.

If the permission token associated with the user information and the external service ID is not stored in the permission token information memory unit 86, in step S37, the authentication processing unit 71 receives a message "false" indicating that the corresponding permission token does not exist from the permission token information memory unit 86.

When the authentication processing unit 71 acquires the permission token within the expiration date from the permission token information memory unit 86, the authentication processing unit 71 provides the permission token to the service application 51, which has requested the acquisition of the permission token, in step S43.

Meanwhile, if the authentication processing unit 71 cannot acquire the permission token within the expiration date from the permission token information memory unit 86, in step S38, the authentication processing unit 71 requests the permission token acquiring unit 114 to acquire the permission token.

In step S39, the permission token acquiring unit 114 acquires a refresh token, which is associated with the user information and the external service ID, from the permission setup information memory unit 84. The permission token acquiring unit 114 requests the permission token to the external service system using the refresh token.

In step S40, the permission token acquiring unit 114 acquires the permission token and its expiration date from the external service system. In step S41, the permission token acquiring unit 114 provides the permission token and its expiration date, which are acquired from the external service system, to the authentication processing unit 71.

In step S42, the authentication processing unit 71 stores the permission token and its expiration date, which are provided from the permission token acquiring unit 114, in the permission token information memory unit 86 in association with the user information and the external service ID. Thereafter, in step S43, the authentication processing unit 71 provides the permission token to the service application 51, from which the permission token has been requested to acquire. In or after step S44, the service application 51 can request the WebAPI of the external service system to perform processes using the permission token which is provided.

Because the permission token associated with the single user information and the single external service can be shared between or among different service applications, session information between the service applications and the external service system can be reduced to thereby reduce a load given to the external service system.

<<Cooperation Between Asynchronous Process and External Service System>>

Figure 19:
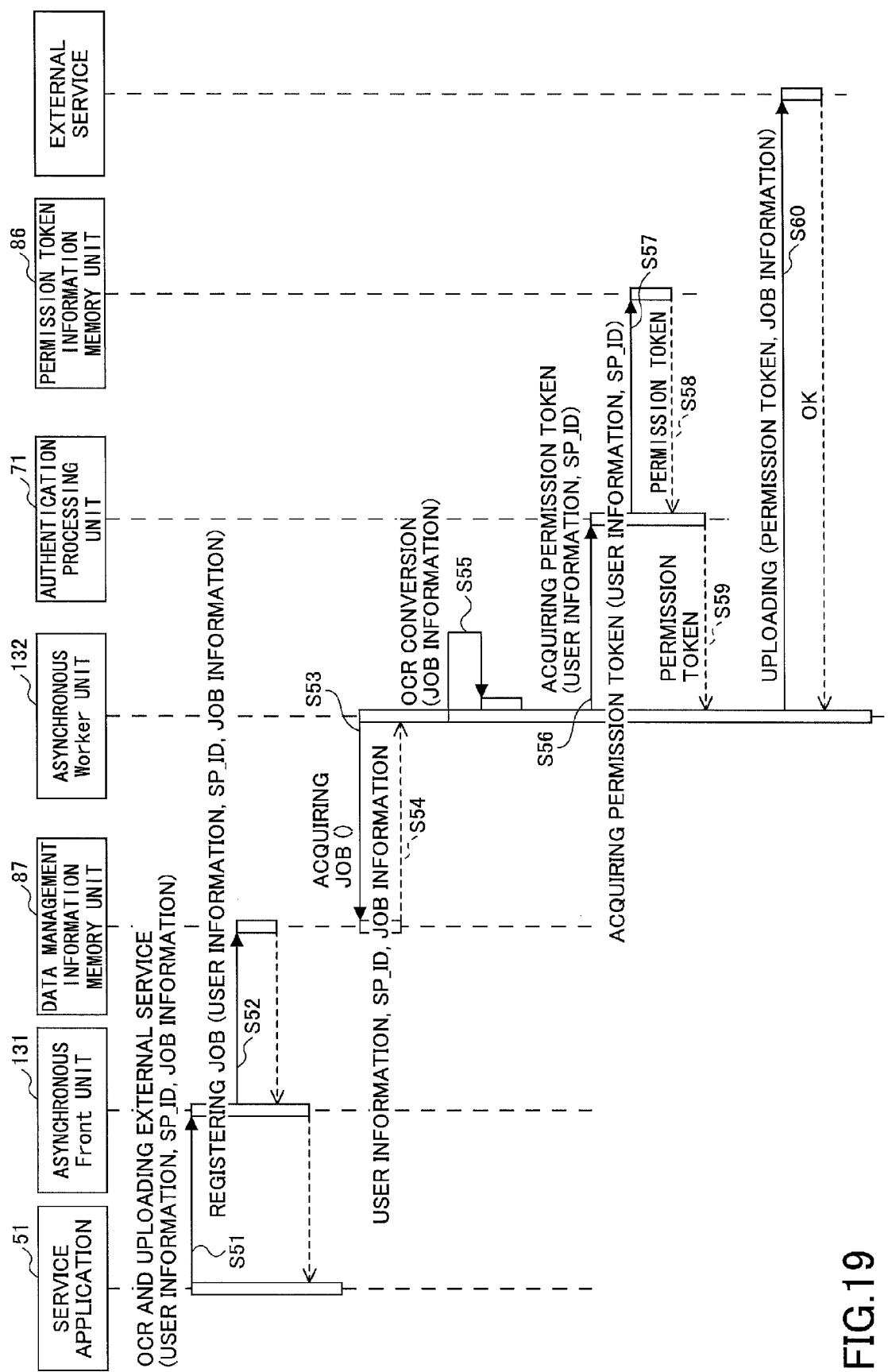
FIG. 19 is a sequence chart illustrating an exemplary procedure in which an asynchronous process and an external service system cooperate.

FIG. 19 is a sequence chart illustrating an exemplary procedure, in which an asynchronous process and the external service system cooperate. The sequence chart of FIG. 19 illustrates the process of uploading the external service system after an OCR converting process as an exemplary asynchronous process performed by an asynchronous worker unit 132 of the data processing unit 74.

In a case where the external service system is used after the OCR converting process as the exemplary asynchronous process is performed as illustrated in FIG. 19, the asynchronous work unit 132 undertakes communications with the external service system. Ordinarily, in a case where the permission token for the external service is acquired by the service application 51 from the authentication processing unit 71, the authentication ticket from the authentication processing unit 71 is necessary.

However, in a case where the asynchronous process is performed, when the asynchronous worker unit 132 requests the authentication processing unit 71 to acquire the permission token of the external service using the authentication ticket, there is a possibility that the authentication ticket is expired. Therefore, the service providing system 50 trusts the asynchronous worker unit 132. Thus, the authentication ticket used in requesting to acquire the permission token for the external service is not required.

For example, by arranging the authentication processing unit 71 and the asynchronous worker unit 132 in a single network, the asynchronous worker unit 132 is trusted. It can be determined whether the asynchronous worker unit 132 is arranged in the single network by referring to, for example, the IP address of the asynchronous worker unit 132. In order to build a trust relationship between the authentication processing unit 71 and the asynchronous worker unit 132, it is possible to introduce an authentication function such as a basic authentication instead of the above control in the network.

For example, if the process of uploading the external service system after the OCR converting process is requested by the user, in step S51, the service application 51 requests the asynchronous front unit 131 to upload the external service system using the user information, the external service ID, and the job information after the OCR converting process.

In step S52, the asynchronous front unit 131 registers the process of uploading the external system 131 as a job in the data management information memory unit 87 after the OCR converting process requested by the service application 51.

The asynchronous worker unit 132, performing an asynchronous process, sequentially acquires the jobs registered in the data management information memory unit 87 and performs the asynchronous process. In step S53, the asynchronous worker unit 132 acquires the job of the process of uploading the external service system after the OCR converting process 132 registered in the data management information memory unit 87.

In step S55, the asynchronous worker unit 132 reads the data designated by the job information out of the data storage 88 and performs an OCR converting process. In step S56, the asynchronous worker unit 132 requests the authentication processing unit 71 to acquire the permission token using the user information and the external service ID.

In step S57, the authentication processing unit 71 requests the permission token information memory unit 86 to acquire the permission token associated with the user information and the external service ID. In step S58, the authentication processing unit 71 acquires the permission token associated with the user information and the external service ID. In step S59, the authentication processing unit 71 provides the permission token associated with the user information and the external service ID to the asynchronous worker unit 132.

In step S60, the asynchronous worker unit 132 can upload the data after the OCR converting process to the external service system using the permission token provided from the authentication processing unit 71.

<General Overview>

The system 1 of the embodiment can solve, for example, the following four problems.

As the first problem, in a case where an external service system displays the permission screen 1010, each of the service applications 51 with UI frequently has a client function for the OAuth authentication. In this case, it is necessary that each of the service applications 51 performs the OAuth authentication. Therefore, the service applications 51 individually manage the security data.

Accordingly, in this case, security data are dispersed by an increase of the service applications 51 to cause a problem in that security is lowered. Further, in this case, the service applications 51 are required to individually ensure the security. Therefore, there is a problem in that a management cost increases.

In the system 1 of the embodiment, client functions for OAuth authentication can be concentrated in one position to thereby enable a uniform management. Therefore, not only the security is improved but also the management cost can be reduced.

As a second problem, in a case where the scopes are different for each of the service applications 51, the permission process of the OAuth authentication is required to be performed for each of the service applications 51. In this case, the usability is lowered.

The system 1 of the embodiment can use various mashup services regardless of the types of the service applications 51 with a one-time permission procedure performed by the administrator of uniformly managing the management process for managing the permission information such as the permission setup information, the external service information, the permission token, or the like and the permission process in the authentication processing unit 71.

As a third problem, there is a case where a permission process is not performed by an office equipping device, which cannot display a UI of HTML in a protocol of OAuth authentication.

In the system 1 of the embodiment, the permission process and the process of using the external service are separated. Therefore, the mashup service can be used by a device without a UI of HTML.

As a fourth problem, there is a case where a user of a company accesses a shared resource in an external service system designated by an administrator of the company after the user himself or herself has an account of the designated external service system and follows a permission procedure.

In the system 1 of the embodiment, since the administrator can act for the user to follow the permission procedure for the user, it is possible to manage such that an access is allowed only to the designated external service system. For example, in the system 1 of the embodiment, it is possible to cause the user to use the permission token in conformity with a management policy.

As described, in the system 1 of the embodiment, the client functions of OAuth authentication are concentrated for a multi-tenant type application. Thus, complexity of the system is reduced and the management cost can be prevented from increasing. Further, in the system 1 of the embodiment, the security data can be uniformly managed and the security can be improved.

Further, in the system 1 of the embodiment, usability can be improved by reducing the number of times of the permission procedures by the user. Further, in the system of the embodiment, the mashup service can be easily used by a device without an UI. Further, in the system 1 of the embodiment, since the administrator can act for the user to follow the permission procedure for the user, it is possible to manage such that an access is allowed only to the designated external service system.

A first service providing system in the claims corresponds to, for example, the service providing system 50. A second service providing system in the claims corresponds to, for example, the external service system. A service providing apparatus in the claims corresponds to, for example, the service providing system 50. Post-permission authority information in the claims corresponds to, for example, the permission token. Information required to reissue the post-permission authority information in the claims corresponds to, for example, the refresh token.

A connection destination changing unit in the claims corresponds to, for example, the redirect requesting unit 113.

The authority information acquiring unit in the claims corresponds to, for example, the permission token acquiring unit 114.

An authority information providing unit in the claims corresponds to, for example, the permission token providing unit 116.

An authority information storing unit in the claims corresponds to, for example, the permission token storing unit 115.

A first memory unit in the claims corresponds to, for example, the permission setup information memory unit 84, the external service information memory unit 85, and the permission token information memory unit 86.

An authority information acquisition requesting unit in the claims corresponds to, for example, the permission token acquisition requesting unit 123.

The processing requesting unit in the claims corresponds to, for example, the processing requesting unit 124. A cooperation process receiving unit 131 in the claims corresponds to, for example, the asynchronous front unit 131. A cooperation process performing unit 132 in the claims corresponds to, for example, the asynchronous worker unit 132.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the system has been described in detail, it should be understood that various changes, substitutions, and alterations could be made thereto without departing from the spirit and scope of the invention.

This application is based upon and claims the benefit of priority of the prior Japanese Patent Application No. 2012-241368, filed on Oct. 31, 2012, the entire contents of which are incorporated herein by reference.

What is claimed is:

1. A method performed in a system including a first service providing system that includes a hardware processor to provide a service to an apparatus and a second service providing system that includes another hardware processor to provide an external service and has an authentication infrastructure different from that of the first service providing system, the apparatus, the first service providing system, and the second service providing system being connected through a network, the method comprising:

receiving, by the first service providing system, a permission request, from the apparatus operated by a first user, of requesting that a second user uses the second service providing system;

changing, by the first service providing system, a connection destination of the apparatus to the second service providing system;

causing, by the first service providing system, the second service providing system to perform a permission process;

receiving, by the first service providing system, permission information indicating that the permission request is admitted for the second user from the apparatus;

acquiring, by the first service providing system, a permission token for using the second service providing system by using the permission information from the second service providing system; and providing, by the first service providing system, the permission token associated with the second user based on a request for a process using the second service providing system, the request being received from another apparatus which is connected to the second service providing system and operated by the second user, receiving, by the second service providing system, the permission token, validating the permission token, and permitting the another apparatus to use the second service providing system.

2. The method according to claim 1, further comprising:

storing, by the first service providing system, the permission token acquired from the second service providing system, user information of the second user, and identification information of the second service providing system by associating the permission token with the user information and the identification information into a first memory device included in the first service providing system.

3. The method according to claim 2, wherein the first service providing system acquires the permission token and an expiration date of the permission token, and information required to reissue the permission token from the second service providing system using the permission information, and the first service providing system stores the permission token, the expiration date of the permission token, the information required to reissue the permission token in association with the user information of the second user and the identification information of the second service providing system into the first memory device.

4. The method according to claim 3, wherein the first service providing system acquires the permission token from the second service providing system using the information required to reissue the permission token if the permission token, which is associated with the user information of the second user and the identification information of the second service providing system and whose expiration date has been expired.

5. The method according to claim 1, further comprising:

receiving, by the first service providing system, the request for the process using the second service providing system from the another apparatus operated by the second user; and requesting the first service providing system to send the permission token associated with the second user; and requesting, by the first service providing system, the second service providing system to process using the acquired permission token associated with the second user.

6. The method according to claim 1, further comprising:

receiving, by the first service providing system, a request for a cooperation process of making an asynchronous process and the second service providing system cooperate;

registering, by the first service providing system, information of the cooperation process in a second memory device;

acquiring, by the first service providing system, the information of the cooperation process from the second memory device, acquiring, by the first service providing system, the permission token associated with the second user from the first memory device after the asynchronous process is performed; and requesting, by the first service providing system, the second service providing system to perform the process using the permission token.

7. The method according to claim 1, further comprising:

storing, by the first service providing system, information specifying an authority range of the permission token in association with the user information of the second user and the identification information of the second service providing system.

8. A method performed by a service providing apparatus that provides a service to apparatuses, the method comprising:

receiving, by the first service providing system, a permission request, from a first apparatus operated by a first user, of requesting that a second user uses the second service providing system;

changing, by the first service providing system, a connection destination of the first apparatus to the second service providing system;

causing, by the first service providing system, the second service providing system to perform a permission process;

receiving, by the first service providing system, permission information indicating that the permission request is admitted for the second user from the first apparatus;

acquiring, by the first service providing system, a permission token for using the second service providing system by using the permission information from the second service providing system; and providing, by first service providing system, the permission token associated with the second user based on a request for a process using the second service providing system, the request being received from a second apparatus which is connected to the second service providing system and operated by the second user, receiving, by the second service providing system, the permission token, validating the permission token, and permitting the another apparatus to use the second service providing system.

* * * * *